US006766761B1

(12) United States Patent
Tamez, Jr. et al.

(10) Patent No.: US 6,766,761 B1
(45) Date of Patent: Jul. 27, 2004

(54) FIREHOSE COUPLING EXIT INDICATOR

(76) Inventors: Isidro Tamez, Jr., 7410 Ilex, Houston, TX (US) 77012; Dwight E. Allen, 857 Lucky St., Cypress, TX (US) 77433; James H. Godlove, 10807 Zircon Ct., Houston, TX (US) 77099

( * ) Notice: Subject to any disclaimer, the term of this patent is extended or adjusted under 35 U.S.C. 154(b) by 0 days.

(21) Appl. No.: 10/359,837

(22) Filed: Feb. 7, 2003

(51) Int. Cl.[7] .......... G01D 13/22

(52) U.S. Cl. .......... 116/205; 116/DIG. 17; 116/265; 285/93; 182/18

(58) Field of Search .......... 116/205, 200, 116/201, 264, 265, DIG. 17; 40/316; 182/178.3, 178.5, 186.8, 18; 285/93

(56) References Cited

U.S. PATENT DOCUMENTS

| | | | | | |
|---|---|---|---|---|---|
| 1,198,476 | A | * | 9/1916 | Pearson | 137/224 |
| 1,225,616 | A | * | 5/1917 | Gough | 285/45 |
| 1,966,718 | A | * | 7/1934 | Hanson | 285/313 |
| 1,978,245 | A | * | 10/1934 | Barker | 285/39 |
| 2,491,699 | A | * | 12/1949 | Wing | 15/443 |
| 3,104,816 | A | * | 9/1963 | Jaffe | 239/35 |
| 4,592,575 | A | * | 6/1986 | Hughes et al. | 285/252 |
| 4,844,000 | A | | 7/1989 | Clement | 116/205 |
| 4,884,000 | A | | 11/1989 | Muller | 310/268 |
| D312,390 | S | | 11/1990 | Clement | D8/395 |
| 5,027,741 | A | | 7/1991 | Smith et al. | 116/205 |
| D345,519 | S | | 3/1994 | Clement | D10/109 |
| D374,408 | S | * | 10/1996 | McMillan | D10/109 |
| 5,623,890 | A | | 4/1997 | Lenske | 116/205 |
| 5,697,652 | A | * | 12/1997 | Nishikawa | 285/314 |
| 5,988,101 | A | * | 11/1999 | Jacobs et al. | 116/205 |
| 6,504,103 | B1 | * | 1/2003 | Meyer et al. | 174/167 |

OTHER PUBLICATIONS

Drawing of shuttle tanker and buoy.

* cited by examiner

*Primary Examiner*—Diego Gutierrez
*Assistant Examiner*—Amy R Cohen
(74) *Attorney, Agent, or Firm*—Gary L. Bush; Andrews Kurth LLP

(57) ABSTRACT

An indicator device captured between couplers of ends of firehose sections that point to the source of the firehose and to safety. The preferred embodiment includes gasket-like annular body which fits over the male threads of the male coupler and is captured between annular ends of the abutting male and female coupler bodies. Direction pointing fingers, integral with the annular body, point backward toward the hose section to which the male coupler is attached and are angularly oriented to fit between longitudinal lugs of the male coupler.

12 Claims, 1 Drawing Sheet

FIREHOSE COUPLING EXIT INDICATOR

BACKGROUND OF THE INVENTION

1. Field of the Invention

This invention concerns indicators associated with a firehose to help a firefighter find his way to safety via the firehose from a smoke-filled building.

2. Description of Prior Art

A primary concern of fire fighting personnel is that of becoming lost in a burning or smoke-filled structure where the firefighter does not know the direction to the outside. Firefighters are commonly taught to follow the firehose lines, knowing that the firehose connects from an outside source of water to the water spraying nozzle. However, under the stresses and pressures of a fire emergency, a firefighter may lose his sense of direction, and upon finding a firehose may be unable to conclude which direction leads to the outside water source and which direction leads to the nozzle. As explained in U.S. Pat. No. 4,884,000, innumerable other problems can arise which further minimize the chances of a safe escape.

U.S. Pat. No. 4,884,000, issued Jul. 4, 1989 to Clement, describes a flexible band or clamp with directional fingers protruding perpendicularly from the band. The band is attached to the firehose and helps indicate the direction to the water connection source of the firehose. The clamp of the '000 patent allows a firefighter to feel along the firehose and determine the direction to the exit. The clamp is a flexible removable band which must be retrofitted along the length of the firehose. The embodiments described include a steel spring clamp capable of being slipped over an unrolled firehose and a flexible band with fastener which encircles the firehose and may remain on a stored firehose. U.S. Pat. No. Des. 312,390 issued Nov. 7, 1990 and U.S. Pat. No. 345,519 issued Mar. 29, 1994, both to Clement, show various embodiments of the directional bands as essentially described in Clement's '000 patent.

Problems are inherent in a device which must be attached by encircling a firehose. Such a device must be able to withstand heat; must be able to withstand sudden expansion or change in shape caused by the high water pressure through a firehose; must be able to withstand abuse to its surface when being dragged over rough surfaces; and must be able to avoid snagging objects and hampering movement of the firehose. Yet, simultaneously, the device must also be able to remain sufficiently flexible to allow the firehouse to be stored in a flattened coil or roll; must be able to avoid restriction of water flow by kinking a firehose; and more importantly, must be able to withstand being dislodged or removed through abuse of the hose so that the device is there when the firefighter needs it.

U.S. Pat. No. 5,027,741, issued Jul. 2, 1991 to Smith et al, addresses many of these problems in two embodiments of an emergency escape firehose. The '741 embodiments incorporate stiff bristles permanently interwoven at an angle into the canvas surface of a firehose. In the first embodiment, the fibers' angle points towards the connection of the firehose with the water source so enabling a firefighter to feel a smooth surface in that direction and a resistant surface in the direction towards the nozzle connection. In the second embodiment, the fiber angles are reversely inclined and the firefighter must know that the direction towards the resistant feel of the firehose will lead him to the water source connection.

However, when a firefighter is faced with an extreme emergency or panic circumstance, a safety escape device should also be intuitive to use so as to minimize the need for use of cognitive skills. A rookie firefighter trying to remember whether the rough direction is to the fire or to the source has no intuitive clues whether "smooth" is out or "rough" is out. In contrast, everyone intuitively understands a pointer or directional arrow.

The third and fourth embodiments of the '741 patent include a series of annular members attached to the outer surface of the firehose wherein the annular member is inclined to indicate direction. A fifth and sixth embodiment include application of a luminous tapered stripe to the firehose. While these embodiments are more intuitive, they too have the same problems and disadvantages as previously noted.

U.S. Pat. No. 5,623,890 describes a firehose coupling comprising male and female components which thread together to connect firehose sections. The male coupling component always indicates the direction of water flow. The '890 patent discloses an elongated extension integrally attached to each lug of a male component of a firehose coupling. Such lugs are costly to manufacture and require large capital expenditures to provide new coupling sets to equip many firehoses for a large city fire department.

3. Identification of Objects of the Invention

A primary object of the invention is to provide a direction indicating device at the coupling between firehose sections that is inexpensive to manufacture, yet provides a reliable indicator toward the hose source for a firefighter in a dark, smoke-filled building.

Another object of the invention is to provide an inexpensive direction indicating device that can be attached to couplings of existing firehoses so that entire new couplings need not be purchased.

SUMMARY OF THE INVENTION

The objects identified above along with other advantages and features are embodied in a gasket-like indicating device which fits over the male threads of a male coupling of a firehose. The indicating device has integral indicating fingers which point backward from the coupling toward the hose source. Such fingers fit in the gaps of the lugs of the male coupling. The fingers preferably are shaped like arrowheads so that a firefighter can determine by feel the direction to which they are pointing. In one embodiment of the invention, the fingers of the device increase in thickness toward the pointed end to provide a further tactile indicator of the direction toward the firehose source.

BRIEF DESCRIPTION OF THE DRAWINGS

The objects, advantages and features of the invention will become more apparent by reference to the drawings which are appended hereto and wherein an illustrative embodiment of the invention is shown, of which.

DETAILED DESCRIPTION OF THE PREFERRED EMBODIMENTS

Figure 1:
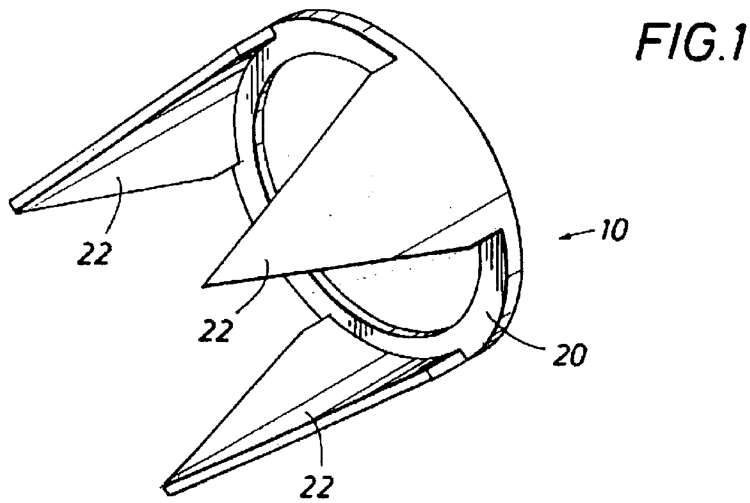
FIG. 1 is a perspective view of a gasket-like device to be placed about the male end of a firefighting hose section to indicate the direction toward the firehose source.
Figure 2:
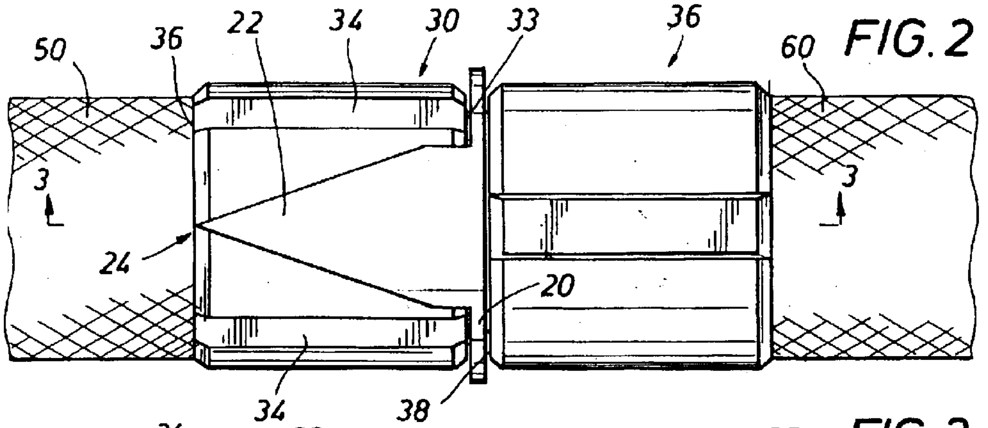
FIG. 2 is a side view of firehose sections connected together by male and female couplings with integrated arrowhead-like pointing fingers placed between lugs of the male coupling.
Figure 3:
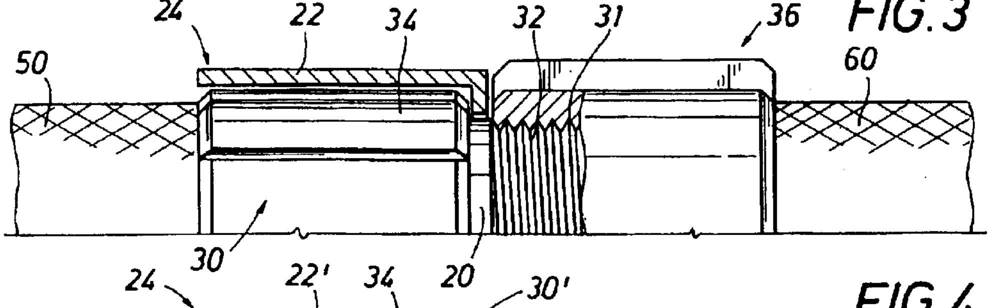
FIG. 3 is a partial cross-section view of the firehose coupling of FIG. 2 taken along section lines 3—3 showing the arrowhead-shaped fingers of the gasket-like device of uniform thickness.

The indicating device 10 of FIGS. 1–3 includes a flat annular body 20 with a plurality of arrowhead-shaped fingers 22 which are integral with the body 20 and extend perpendicularly in a common direction from the plane of body 20. As shown in FIGS. 2 and 3, the body 20 is like a gasket in that it extends over the end of male threads 32 of male coupling 30 at the end of a hose section 50. The body 20 abuts the annular shoulder 33 of male coupler 30. The direction-indicating fingers 22 are spaced about body 20 so as to fit between lugs 34 of male coupler 30. Three lugs 34 are common for firehouse couplers, so three direction indicating fingers are provided for such couplers, but four fingers are provided for couplers with four lugs, etc.

As shown in FIGS. 2 and 3, coupled hose sections 50, 60 are selectively coupled to each other by male and female threaded couplers 30, 36. The body 20 is captured between annular shoulders 33, 38 of couplers 30, 36 when the female threads 31 of coupler 36 are threaded onto the male threads 32 of coupler 30. The integral fingers 22 fit between lugs 34 of the male coupler 30 and point toward the hose source and away from the end of the hose where a nozzle is typically provided and carried to the fire inside a building.

With the indicating device supplied at each hose section coupling, a firefighter in a dark smoke-filled burning building can find a firehose and feel for the couplings, and upon feeling or seeing the arrowhead-like fingers 22 between lugs 24, immediately know the direction to the source of the hose and know that such direction is to the outside of the burning building and away from the nozzle of the hose inside the building. Following the hose in the indicated direction allows the firefighter to exit the burning building.

Figure 4:
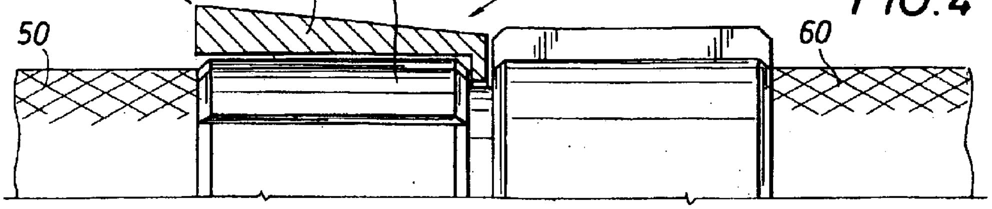
FIG. 4 is a partial cross-section view like that of FIG. 3 but with arrowhead fingers increasing in thickness toward the pointed end of the arrowhead finger.

FIG. 4 illustrates an alternative embodiment of the invention with an indicating device 30' like that shown in FIGS. 1–3, but with arrowhead fingers 22' having increasing thickness toward their pointed ends.

The indicating devices of FIGS. 1–4 can be manufactured inexpensively by injection molding techniques of sturdy plastic. The plastic can be of bright colors such as yellow or orange to help the firefighters see the arrowhead fingers in limited light, but of course the firefighter can feel the pointed finger ends, even with firefighting gloves. The embodiment of FIG. 4 provides increased thickness of ends 24 of arrowhead fingers 22' as an additional indicator for a firefighter to feel with his hands to determine the direction out of the building, but the thickness is arranged so that the arrowhead fingers 22' do not extend radially beyond the radial extent of the coupling lugs, so that the fingers will be protected from damage during use.

What is claimed is:

1. A directional indicator for a firehose coupling system, the coupling system including a male coupler (30) with male threads (32) secured to a first section (50) of firehose, said male coupler having a cylindrical body (30) with an annular shoulder (33) from which said male threads (32) extend outwardly and a plurality of raised longitudinal lugs (34) which define spaces between said lugs on said cylindrical body, said system including a female coupler (36) secured to a second section (60) of firehose, said female coupler having female threads arranged and designed for securement to said male threads of said male coupler, the directional indicator (10) comprising, a flat annular body (20) which is arranged and designed to abut said annular shoulder (33) of said male coupler (30), and a plurality of arrowhead-shaped fingers (22) which are integral with said annular body with each of said fingers (22) being arranged and designed for placement between two lugs (34) of said male coupler (30) and pointing in a direction opposite that of said male threads (32).

2. The directional indicator (10) of claim 1 wherein, said arrowhead-shaped fingers (22) have ends (24) which extend toward said first section (50) of said firehose when said body (20) abuts said shoulder (33).

3. The directional indicator (10) of claim 2 wherein, said arrowhead-shaped fingers (22) are of substantially uniform thickness from said annular body (20) to said ends (24).

4. The directional indicator (10) of claim 2 wherein, said arrowhead-shaped fingers (22) are characterized by increasing thickness from said annular body (20) to said ends (24).

5. The directional indicator (10) of claim 1 wherein, said annular body (20) and said arrowhead-shaped fingers (22) are fabricated of rugged plastic material.

6. The directional indicator (10) of claim 1 wherein, said flat annular body (20) is arranged and designed for capture between said annular shoulder (33) of said cylindrical body (30) of said male coupler and a corresponding annular shoulder of said female coupler (36).

7. A directional indicator for a firehose coupler system having a male coupler secured to a first hose section with a male cylindrical body with a male annular shoulder and male threads extending outwardly therefrom and a female coupler secured to a second hose section with female threads interior to female cylindrical body which has a female annular shoulder, said indicator comprising, an annular body arranged and designed to pass over said male threads and to be captured between abutting shoulders of said male cylindrical body and said female cylindrical body, and a plurality of fingers which are integral with said annular body, each finger arranged and designed to extend longitudinally from said male cylindrical body in a direction away from said male threads.

8. The directional indicator of claim 7 wherein, said fingers are radially spaced from said male cylindrical body, when said body abuts said male cylindrical body.

9. The directional indicator of claim 7 wherein, said fingers are in the shape of an arrowhead.

10. The directional indicator of claim 9 wherein, said male cylindrical body includes longitudinal lugs, and said fingers are placed in spaces between said lugs.

11. The directional indicators of claim 9 wherein, said fingers are of uniform thickness from said annular body to said ends.

12. The directional indicator of claim 9 wherein, said fingers are thicker at their ends than at their connections to said annular body.

* * * * *